(12) United States Patent
Huang et al.

(10) Patent No.: US 11,492,905 B2
(45) Date of Patent: Nov. 8, 2022

(54) LIDAR-BASED CONVERGENCE DEFORMATION MONITORING SYSTEM FOR SURROUNDING ROCK AROUND TBM SHIELD REGION

(71) Applicants: Institute of Rock and Soil Mechanics, Chinese Academy of Sciences, Hubei (CN); Wuhan University, Hubei (CN)

(72) Inventors: Xing Huang, Hubei (CN); Quansheng Liu, Hubei (CN); Xianze Xu, Hubei (CN); Tong Zheng, Hubei (CN); Xiaoping Zhang, Hubei (CN); Fengqiu Xu, Hubei (CN)

(73) Assignees: Institute of Rock and Soil Mechanics, Chinese Academy of Sciences, Hubei (CN); Wuhan University, Hubei (CN)

( * ) Notice: Subject to any disclaimer, the term of this patent is extended or adjusted under 35 U.S.C. 154(b) by 616 days.

(21) Appl. No.: 16/556,246

(22) Filed: Aug. 30, 2019

(65) Prior Publication Data

US 2020/0191965 A1    Jun. 18, 2020

(30) Foreign Application Priority Data

Dec. 13, 2018   (CN) .......................... 201811524212.4

(51) Int. Cl.
*E21D 9/00* (2006.01)
*G01S 7/481* (2006.01)
(Continued)

(52) U.S. Cl.
CPC ............ *E21D 9/003* (2013.01); *G01S 7/4813* (2013.01); *E21C 35/24* (2013.01); *E21D 9/004* (2013.01);
(Continued)

(58) Field of Classification Search
CPC ......... E21D 9/004; E21D 9/003; E21D 9/108; E21C 35/24; G01S 7/4813; G01S 17/42; G01S 17/88; G01S 17/89; G01S 7/027
See application file for complete search history.

(56) References Cited

U.S. PATENT DOCUMENTS

2015/0233242 A1\* 8/2015 Li ........................ G01S 13/885
342/22
2018/0284232 A1\* 10/2018 Peters ................... G01S 7/4813

FOREIGN PATENT DOCUMENTS

CN    101943003    1/2011
CN    201853336    6/2011
(Continued)

OTHER PUBLICATIONS

English language translation of Yellow River, Chinese Patent Application Publication No. CN-207879337, published Sep. 18, 2018 (4 pages) (Year: 2018).\*

(Continued)

*Primary Examiner* — Janine M Kreck
*Assistant Examiner* — Michael A Goodwin
(74) *Attorney, Agent, or Firm* — JCIP Global Inc.

(57) ABSTRACT

A lidar-based convergence deformation monitoring system for surrounding rock around a TBM shield region, including a data acquisition module. The data acquisition module includes: a lidar, a push-rod motor, an H-bridge circuit, a power supply module, an ARM chip, a guide rod, a linear bearing, a tempered glass cover and a protective case. The lidar and the push-rod motor are connected to a lidar connector to acquire raw data of the surrounding rock and store the raw data in the ARM chip. A middle portion of a top plate of the protective case allows the lidar to extend out of the protective case. The protective case is fastened to an inner wall of the TBM shield through two mounting brackets (Continued)

on both sides of the protective case, and the inner wall facilitates the lidar to extend out of the protective case to perform a measurement.

18 Claims, 4 Drawing Sheets

(51) Int. Cl.
  *E21C 35/24* (2006.01)
  *E21D 9/10* (2006.01)
  *G01S 17/42* (2006.01)
  *G01S 17/89* (2020.01)
(52) U.S. Cl.
  CPC .............. *E21D 9/108* (2013.01); *G01S 17/42* (2013.01); *G01S 17/89* (2013.01)

(56) References Cited

FOREIGN PATENT DOCUMENTS

| | | | | |
|---|---|---|---|---|
| CN | 103343692 | | 10/2013 | |
| CN | 107607082 | | 1/2018 | |
| CN | 108253938 | | 7/2018 | |
| CN | 207879337 | | 9/2018 | |
| DE | 102005038313 A1 | * | 4/2007 | ............. E21D 9/003 |
| EP | 1911929 A1 | * | 4/2008 | ............. E21D 11/08 |
| JP | H03291512 | | 12/1991 | |
| KR | 20170021219 A | * | 2/2017 | ............. E21D 9/003 |

OTHER PUBLICATIONS

"Office Action of China Counterpart Application" with English translation thereof, dated Feb. 28, 2020, p. 1-p. 14.

* cited by examiner

LIDAR-BASED CONVERGENCE DEFORMATION MONITORING SYSTEM FOR SURROUNDING ROCK AROUND TBM SHIELD REGION

CROSS REFERENCE TO RELATED APPLICATION

This application claims the priority benefit of China application no. 201811524212.4, filed on Dec. 13, 2018. The entirety of the above mentioned patent application is hereby incorporated by reference herein and made a part of this specification.

TECHNICAL FIELD

The present disclosure relates to the technical field of monitoring convergence deformation of surrounding rock around a tunnel boring machine (TBM) shield region, and more particularly, to a lidar-based convergence deformation monitoring system for surrounding rock around a TBM shield region.

BACKGROUND

The TBM is a large-scale equipment for tunnel and subway construction. When the tunnel passes through the deep soft-weak ground with high geo-stress, the surrounding rock around the shield-type TBM's shield region will undergo squeezing and large deformation easily after excavation. When the deformation magnitude of the surrounding rock around the shield region exceeds a reserved overcut gap due to expanding excavation between the surrounding rock and the shield, the surrounding rock contacts the shield and compresses the shield, thereby generating frictional resistance to the outside surface of the shield. When the thrust force provided by the TBM propulsion system is insufficient to overcome the frictional resistance on the shield, disaster, for example, the machine is jammed, will be caused. The TBM jamming accident will result in serious delay in the construction and economic losses, and even machine damage or death. Therefore, the key is to predict and prevent the disaster of TBM jamming caused by squeezing deformation around the shield region and the induced surrounding rock pressures acting on the shield. At present, real-time monitoring of the surrounding rock deformation around the shield region during the tunneling process has become a core technology for the TBM manufacturers and engineers to compete and develop.

Enhancement of monitoring is an important means to prevent the disaster of squeezing deformation and the induced TBM shield jamming during tunneling in soft-weak surrounding ground under high geo-stress. After the TBM starts excavation, the monitoring of the convergence deformation of the surrounding rock is not only an important part of monitoring and early warning for the shield jamming disaster caused by squeezing deformation, but also an important element for evaluating the stability of the surrounding rock, determining the key parts of the surrounding rock deformation and fracturing, and providing reasonable supporting strength and supporting time. In TBM tunneling, monitoring of the convergence deformation of the surrounding rock around the shield region is the key to judge the initial contact point and contact range between the surrounding rock and shield, and in further predict shield jamming disaster. There are many ways to monitor the displacement of tunnel surrounding rock, in most cases, the manual measurement is adopted. At present, there are two main methods: convergence meter method and total station method. The convergence meter method is the most widely used monitoring method in daily use, which adjusts the tensioned steel ruler by the tension adjuster of the convergence meter to read the displacement. The early convergence meters use a dial gauge to measure and read the relative displacement changes at two points around the tunnel. Most of them now use a digital display for measuring and reading. This measurement method is simple, convenient, flexible, and small in investment, but requires a worker to pull out the steel rule to read, the efficiency is relatively lower, the measurement result is easily affected by human factors, the precision of the measurement result is not high. Thus, when the measurement environment is bad, the tunnel span is large, and the terrain is complex, this method is difficult to use.

In addition to the convergence meter method, the total station method is currently used to freely set up stations to observe the clearance displacement of the surrounding rock in tunnels and underground projects. By this technology, the measurement data of the clearance displacement of the surrounding rock in the tunnel can be automatically acquired. The data is automatically analyzed and processed by a computer and the data analysis result is output in an accurate and visual graph or report form to provide a data basis for determining the stability of the surrounding rock and guiding the construction. This method is a good monitoring and measuring method in the current tunnel excavation.

However, there is usually an overcut gap of 3 to 8 cm between the surrounding rock around the shield-type TBM's shield region and the shield. After the shield-type TBM starts tunneling, the convergence deformation of the surrounding rock usually increases with the distance from the tunnel face, that is, the convergence deformation of the surrounding rock close to the front end of the shield is smaller; the surrounding rock near the end of the shield has a greater convergence deformation and even closes the overcut gap between the surrounding rock and the shield. The devices for the above traditional measurement methods can only be disposed behind the TBM to only obtain the convergence data of the surrounding rock that has been excavated behind the TBM. Because the overcut gap between the surrounding rock around the end of the shield and the shield is usually closed by the convergence of the surrounding rock, and the monitoring sight line from the excavated part behind the TBM is blocked, the deformation data of the surrounding rock around the current TBM shield region cannot be acquired in real time. At present, it is difficult to automatically measure the convergence deformation of the surrounding rock around the shield region, and it is impossible to implement real-time monitoring, i.e., the deformation data of the surrounding rock can only be acquired manually. Moreover, when the shield-type TBM is used, the surrounding rock around the shield region is shielded by the shield and the segmental lining, the monitoring space outside the shield is narrow and small, the monitoring sensor is easily damaged, and the monitoring environment outside the shield is extremely harsh, the engineers cannot directly acquire the geological conditions of the surrounding rock in the tunnel as well as the overall deformation situation, thus, it is an ideal solution to monitor and predict the convergence deformation of the surrounding rock around the shield region through an automatic monitoring system. The present disclosure can solve the above problems well. Compared to infrared and mechanical measurement method, lidar has a higher angle and range resolution. By using the laser propagation time, the lidar makes the detection distance farther and the response speed more sensitive. At the same time, due to using the laser measurement, the measurement environment is less restrictive.

SUMMARY

In view of above-mentioned reasons, the present disclosure provides a lidar-based convergence deformation monitoring system for surrounding rock around a Tunnel Boring Machine (TBM) shield region. The system includes a data acquisition module. The data acquisition module includes: a lidar, a push-rod motor, an H-bridge circuit, a power supply module, an ARM chip, a guide rod, a linear bearing, a tempered glass cover and a protective case.

The lidar and the push-rod motor are connected by a lidar connector and a push-rod connection head, to acquire raw data of the surrounding rock and store the raw data in the ARM chip. The push-rod motor is fastened to a mounting plate of the protective case through a fastening plate of the push-rod motor. The ARM chip, the fastening plate of the push-rod motor and the H-bridge circuit are fastened to the mounting plate of the protective case by screws. The power supply module is fastened within the protective case. A middle portion of a top plate of the protective case directly opposite to the lidar is provided with a lidar hole having a same size as the lidar, to allow the lidar to extend out of the protective case. The tempered glass cover is mounted above the lidar hole, and the tempered glass cover is connected to the guide rod through a through hole. The guide rod is combined with the linear bearing to allow the tempered glass cover to freely move in a vertical direction. The linear bearing is connected to the top plate by screws passing through through-holes on both sides of the linear bearing. The protective case is fastened to an inner wall of the TBM shield through two mounting brackets on both sides of the protective case, and the inner wall is provided with a hole having a same size as the tempered glass cover, to facilitate the lidar to extend out of the protective case to perform a measurement.

In one embodiment, the push-rod motor includes the push-rod connection head, a push rod and a motor. The push-rod connection head is combined with the push rod through an external thread, and the motor is configured to provide power for rising and falling of the push rod.

In one embodiment, the lidar is fastened to the lidar connector by screws passing through four M3 threaded holes in a base of the lidar, while the lidar is connected to a lidar positioning plate by utilizing a side threaded hole. The lidar positioning plate is mounted such that the lidar connector is prevented from rotating around a screw as an axis.

In one embodiment, the push-rod connection head has an L-shaped slot, such that the lidar positioning plate and the L-shaped slot of the push-rod connection head position the lidar connector together.

In one embodiment, the lidar connector is fastened to the push-rod connection head through a screw and a lock nut matching the screw, and a washer is mounted between the push-rod connection head and the screw to increase sealing and slip resistance.

In one embodiment, left and right mud shields, and front and rear mud shields are symmetrically arranged around the lidar hole respectively, and are fastened by screws, which prevent the protective case from losing sealing which results in that rock residue and sediments flow into the protective case when the lidar extends out of the protective case.

In one embodiment, lidar limit plates are symmetrically mounted on both sides of the lidar, the lidar limit plates are fastened to the top plate by the screws to ensure that the lidar is kept to be aligned with the lidar hole.

In one embodiment, the lidar is combined with the push-rod motor, and the raw data acquired by scanning the surrounding rock through the lidar includes angle and distance information, to obtain a deformation amount of the surrounding rock through a corresponding algorithm to draw a longitudinal deformation profile (LDP) curve of the surrounding rock.

In one embodiment, the tempered glass cover is transparent, a number of the through holes is four and a number of the guide rods is four.

In one embodiment, the power supply module is fastened through a U-shaped guide rail.

In one embodiment, the system further comprises a Wi-Fi communication module, the Wi-Fi communication module is mounted on a side plate of the protective case, and the data acquisition module interacts with a host system through the Wi-Fi communication module.

In one embodiment, the host system includes: a computer, a data display module, a data processing and storage module, a data receiving module, a control module and a local area network (LAN) server.

In one embodiment, the host system converts the angle and distance information measured through the lidar into a coordinate of a measurement point on a longitudinal profile of the surrounding rock around the TBM shield region.

In one embodiment, a data result processed by the computer is automatically saved as a spreadsheet with a date as a title, deformation information of the surrounding rock is obtained by a subsequent data processing to draw a corresponding LDP curve.

In one embodiment, the host system sends a control instruction to the data acquisition module according to a communication protocol, to control a process of data acquisition.

In one embodiment, the host system filters the coordinate through a filtering algorithm and fits the filtered coordinate into an LDP curve of the surrounding rock through a curve fitting algorithm.

In one embodiment, an account and a password are adopted to log in a control software, to perform multi-user operation and avoid mutual interference.

In one embodiment, a measurement of convergence deformation of the surrounding rock is completed without affecting a normal operation of the TBM.

In one embodiment, the host system is mounted in a rear control cabin of the TBM.

In the system according to the present disclosure, the protective case is embedded in the inner wall of the shield by using the mounting brackets on both sides, and the lidar extends out of the shield by pushing the tempered glass cover at the top of the protective case, distance information is obtained according to the laser reflection time, and the distance information and the angle information are transmitted to the data processing computer through the wireless transmission module with Wi-Fi. The data processing computer filters the measurement data through a signal processing technique and a curve fitting algorithm to reproduce the longitudinal profile of the surrounding rock. The system can obtain an accurate deformation curve of the surrounding rock in real time, and monitor and warn the TBM shield jamming disaster caused by the squeezing deformation of the surrounding rock, thereby effectively reducing the huge economic loss caused by shield jamming disaster. At the same time, the system is easy to assemble and disassemble, has a small overall volume and adopts a wireless transmission technology, therefore the system is suitable for various complicated geological environments.

DETAILED DESCRIPTION

The present disclosure will be described in more details through the following embodiments in conjunction with the accompanying drawings. It should be appreciated that, the described embodiments herein are only for explaining the present disclosure, and not intended to limit the present disclosure.

Figure 1:
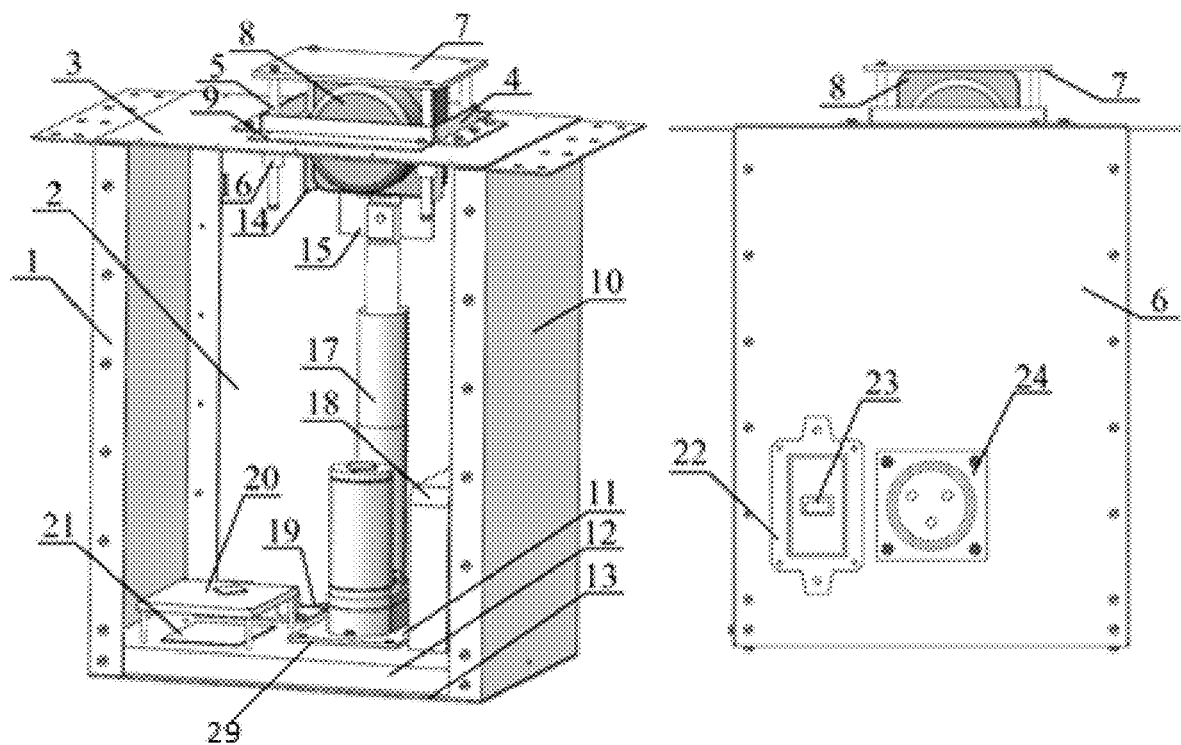
FIG. 1 is a schematic structure diagram illustrating a data acquisition module of a lidar-based convergence deformation monitoring system for surrounding rock around a TBM shield region according to an embodiment of the present disclosure.
Figure 5:
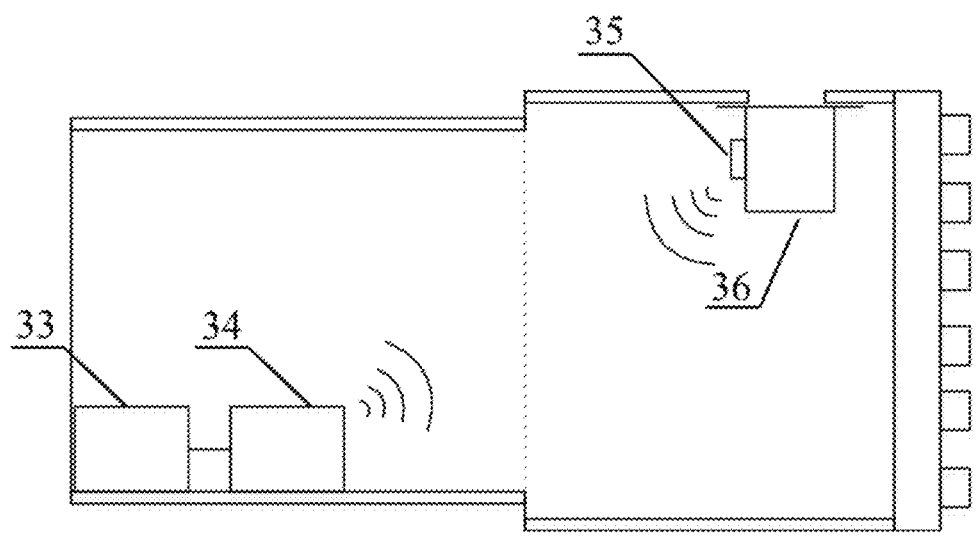
FIG. 5 is a schematic diagram illustrating an arrangement of a lidar-based convergence deformation monitoring system for surrounding rock around a TBM shield region within the TBM shield according to an embodiment of the present disclosure.

The present disclosure provides a lidar-based convergence deformation monitoring system for surrounding rock around a TBM shield region, which includes a data acquisition module mounted within a protective case 36 (FIG. 5). Specifically, as shown in FIG. 1, it is a structural schematic diagram of a data acquisition module of a lidar-based convergence deformation monitoring system for surrounding rock around a TBM shield region according to an embodiment of the present disclosure. The components shown in FIG. 1 include: a left side plate 1 of the protective case, a rear plate 2 of the protective case, a top plate 3 of the protective case, left and right mud shields 4, a guide rod 5, a front plate 6 of the protective case, a tempered glass cover 7, a lidar 8, front and rear mud shields 9, a right side plate 10 of the protective case, a fastening plate 29 of a push-rod motor 17, a mounting plate 12, a bottom plate 13 of the protective case, a lidar limit plate 14, a lidar connector 15, a linear bearing 16, a push-rod motor 17, a power supply module 18, an H-bridge circuit 19, an ARM chip 20, a circuit adapter board 21, a Wi-Fi module protection cover 22, a Wi-Fi module 23, and a power plug 24.

Figure 2:
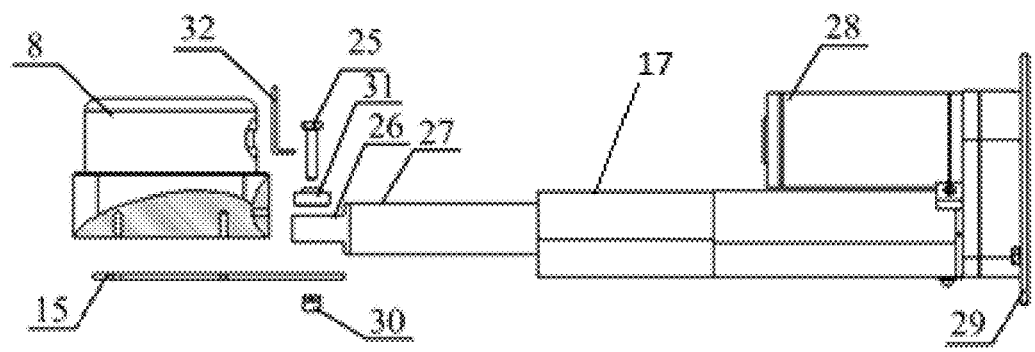
FIG. 2 is a schematic structure diagram illustrating an assembly for assembling a lidar onto a lifting device according to an embodiment of the present disclosure.

In one embodiment, as shown in FIG. 2, a configuration of an assembly for assembling a lidar onto a lifting device is provided. Specifically, the push-rod motor 17 includes a push-rod connection head 26, a push rod 27 and a motor 28. The lidar 8 and the push-rod motor 17 are connected by the push-rod connection head 26 and the lidar connector 15, and the push-rod connection head 26 is in combination with the push rod 27 by an external thread. The push-rod motor 17 is fastened to the mounting plate 12 of the protective case by a fastening plate 29 of the push-rod motor 17. The motor 28 is configured to provide power for the rising and falling of the push rod.

Figure 3:
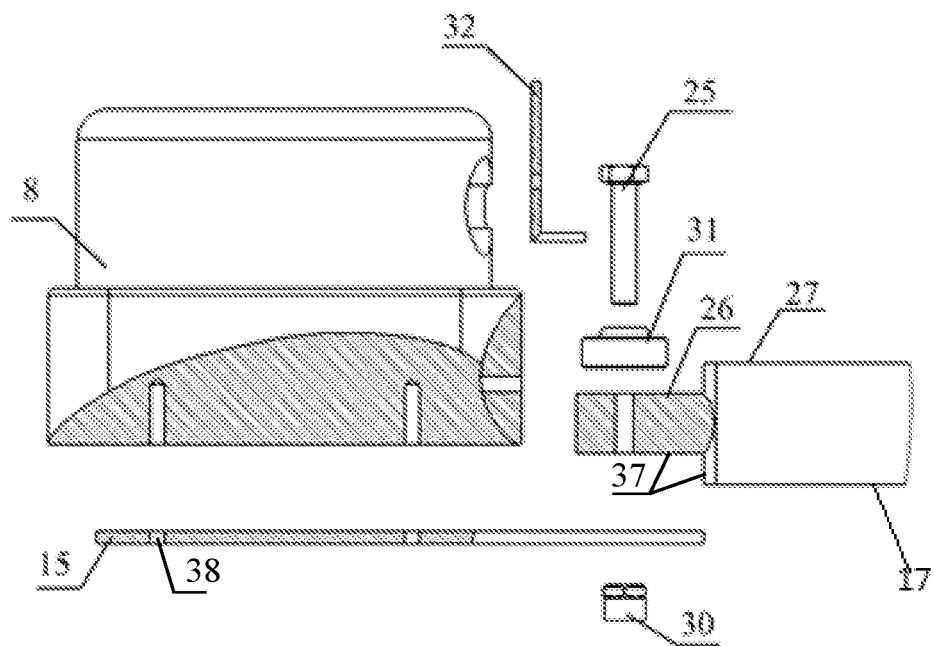
FIG. 3 is a schematic diagram illustrating a local configuration of a connection between a lidar and a lifting device according to an embodiment of the present disclosure.

In one embodiment, as shown in FIG. 3, details of the connection between the lidar 8 and the push-rod motor 17 are provided. Specifically, the lidar 8 is fastened to the lidar connector 15 by screws passing through four M3 threaded holes 38 in the base of the lidar. At the same time, the lidar 8 is connected to a lidar positioning plate 32 by screws through side threaded holes of the lidar. By mounting the lidar positioning plate 32, it is possible to further prevent the lidar connector 15 from rotating around the screw 25 as an axis. The lidar positioning plate 32 and an L-shaped slot 37 of the push-rod connection head 26 position the lidar connector 15 together. The lidar connector 15 and the push-rod connection head 26 are fastened by the screw 25 and a lock nut 30 matching the screw 25. A washer 31 is provided between the push-rod connection head 26 and the screw 25 to increase the sealing and slip resistance.

Figure 4:
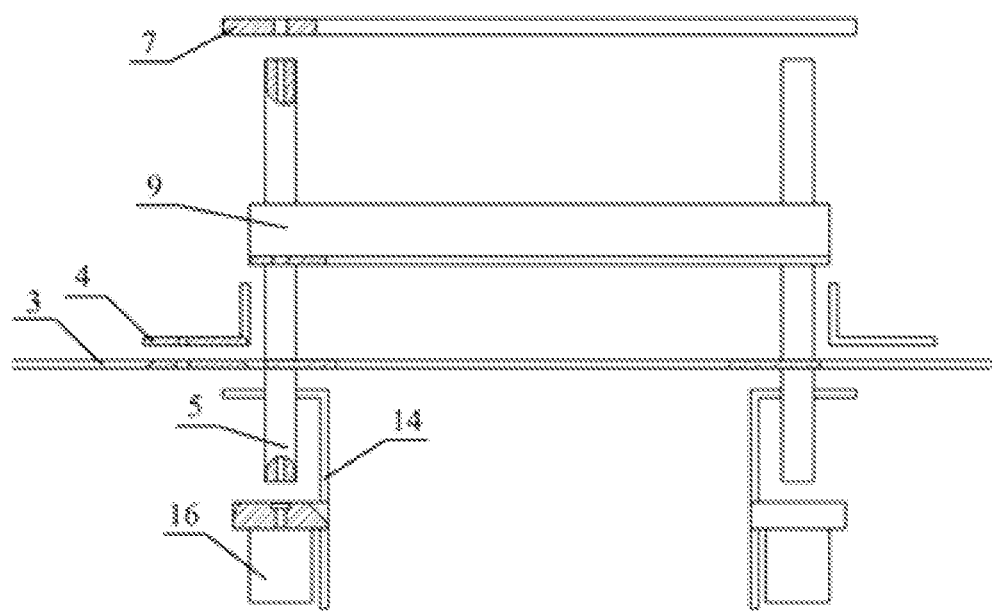
FIG. 4 is a schematic structure diagram of a top plate of a protective case of a data acquisition module according to an embodiment of the present disclosure.

In one embodiment, since the lidar in the data acquisition module is required to extend out of the protective case during data acquisition. As shown in FIG. 4, it is a structural schematic diagram of the top plate of the protective case. The middle portion of the top plate 3 directly opposite to the lidar 8 is provided with a lidar hole having the same size as the lidar 8, such that the lidar 8 can freely extend out of the protective case to perform measurement. The left and right mud shields 4 and the front and rear mud shields 9 are symmetrically arranged around the lidar hole respectively, and are fastened by screws, thereby, when the lidar 8 extends out of the protective case, preventing the protective case from losing the sealing which may result in that the rock residue and sediment flow into the protective case. The tempered glass cover 7 is disposed above the lidar hole in the top plate, and the tempered glass cover 7 is connected to the four guide rods 5 through the four through-holes. The combination of the guide rods 5 and the linear bearing 16 allows the tempered glass cover 7 to freely move in the vertical direction. The linear bearing 16 is connected to the top plate 3 by screws passing through the through-holes on both sides. In order to prevent relative deflection between the lidar and the lidar hole caused by a slight rotation of the push rod of the push-rod motor when the lidar extends out of the protective case, the lidar limit plates 14 are symmetrically mounted on both sides of the lidar. The lidar limit plates 14 are fastened to the top plate by the screw to ensure that the lidar 8 is kept to be aligned with the lidar hole. In addition, a portable Wi-Fi module 35 is mounted on the side plate of the protective case 36 and is protected by a high-strength plastic. The ARM chip 20, the fastening plate 29 of the push-rod motor, the H-bridge circuit 19, and the circuit adapter plate 21 are fastened to the mounting plate 12 by screws, and the power supply module 18 is fastened by a U-shaped guide rail 11.

In one embodiment, as shown in FIG. 5, the protective case 36 is integrally fastened to the inner wall of the TBM shield through mounting brackets of the left side panel 1 and the right side panel 10 of the protective case. The shield (directly above the lidar 8) is provided with a hole having the same size as the tempered glass cover 7. A computer 33 and a corresponding LAN router 34 are mounted in a rear control cabin of the TBM.

Figure 6:
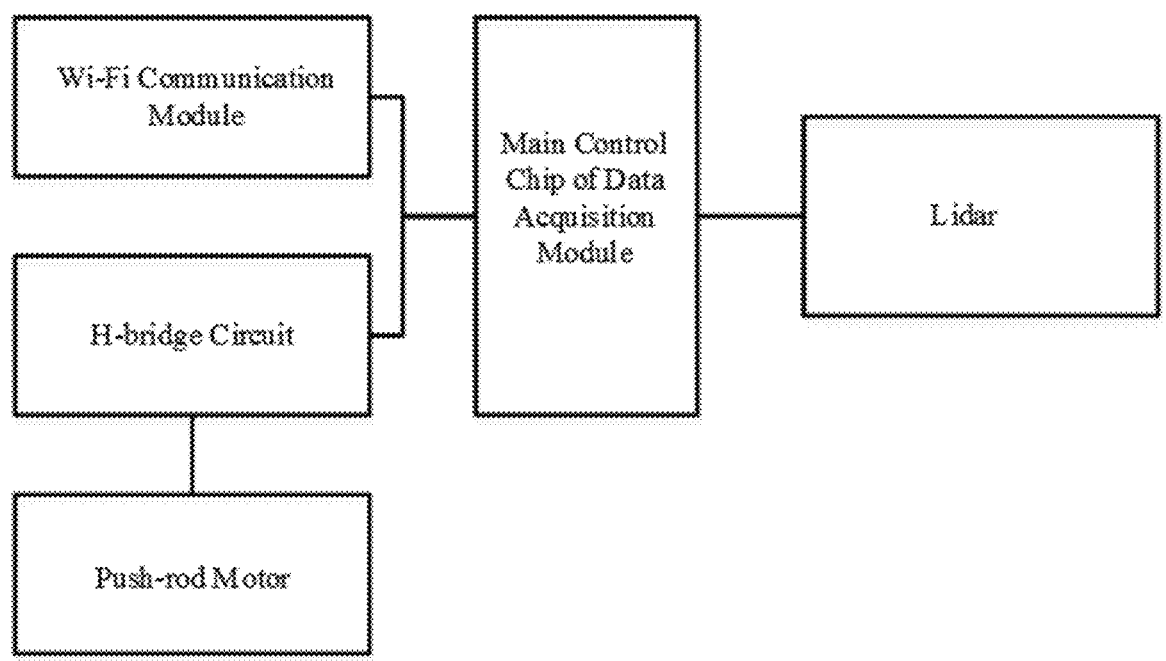
FIG. 6 is a schematic structure diagram illustrating a data acquisition module according to an embodiment of the present disclosure.

In one embodiment, as shown in FIG. 6, the data acquisition module mainly includes a main control chip ARM, a Wi-Fi communication module, an H-bridge circuit, a push-rod motor, and a lidar. The ARM chip is responsible for controlling and coordinating the operation of each module, and the Wi-Fi communication module is responsible for interaction with the host. The ARM chip controls the up or down movement of the push-rod motor by providing a high or low electrical level to the H-bridge circuit. The lidar is responsible for acquiring the original data of the deformation of the surrounding rock, and the acquired data is sent to the host system through the Wi-Fi module.

In one embodiment, the data acquisition module can be fastened to the inner wall of the double shield type TBM shield through the mounting brackets on both sides of the protection case. The inner wall is provided with a hole having the same size as the tempered glass cover, and the data acquisition module is connected to the host.

The data acquisition module includes a lidar, a push-rod motor, an H-bridge circuit, a power supply module, an ARM chip, a portable Wi-Fi module, a guide rod, a linear bearing, a U-shaped guide rail, a tempered glass cover and a protective case. The lidar and the push-rod motor are connected by the lidar connector and the push-rod connection head, and the push-rod connection head is combined with the push rod of the push-rod motor through an external thread. As shown in FIG. 2, the push-rod motor 28 is fastened to the mounting plate of the case by the fastening plate 29 of the push-rod motor.

The lidar is fastened to the lidar connector by screws passing through four M3 threaded holes 38 in the base of the lidar. At the same time, the lidar is connected to the lidar positioning plate by utilizing the side threaded holes. By mounting the lidar positioning plate, it is possible to further prevent the lidar connector from rotating around the screw as the axis. The lidar positioning plate and the L-shaped slot 37 of the push-rod connection head position the lidar connector together. The lidar connector is fastened to the push-rod connection head by the screw and the lock nut matching the screw, and a washer is mounted between the push-rod connection head and the screw to increase the sealing and slip resistance.

The middle portion of the top plate directly opposite to the lidar is provided with a lidar hole having the same size as the lidar, such that the lidar can freely extend out of the protective case to perform a measurement. Mud shields are symmetrically arranged around the lidar hole, and are fastened by screws, thereby, when the lidar extends out of the protective case, preventing the protective case from losing the sealing which may result in that the rock residue and sediment flow into the protective case.

A tempered glass cover is arranged above the lidar hole in the top plate, and the tempered glass cover is connected to four guide rods through through-holes. The combination of the guide rods and the linear bearing allows the tempered glass cover to freely move in the vertical direction, and the linear bearing is connected to the top plate by screws through the through-holes on both sides. The lidar limit plates are mounted on both sides of the lidar symmetrically. The lidar limit plates are fastened to the top plate by the screws to ensure that the lidar is kept to be aligned with the lidar hole. In addition, the portable Wi-Fi module is mounted on the side plate of the protective case and is protected by a high-strength plastic. The ARM chip, the U-shaped guide rail, the H-bridge circuit, and the circuit adapter plate are fastened to the mounting plate by the screws, and the power supply module is fastened through the U-shaped guide rail.

The protective case is integrally fastened to the inner wall of the TBM shield through the screws by utilizing the mounting brackets of the left panel and the right panel of the protective case. The shield directly above the lidar is provided with a hole having the same size as the tempered glass cover. A computer and a corresponding LAN router are mounted in the rear control cabin of the TBM.

Figure 7:
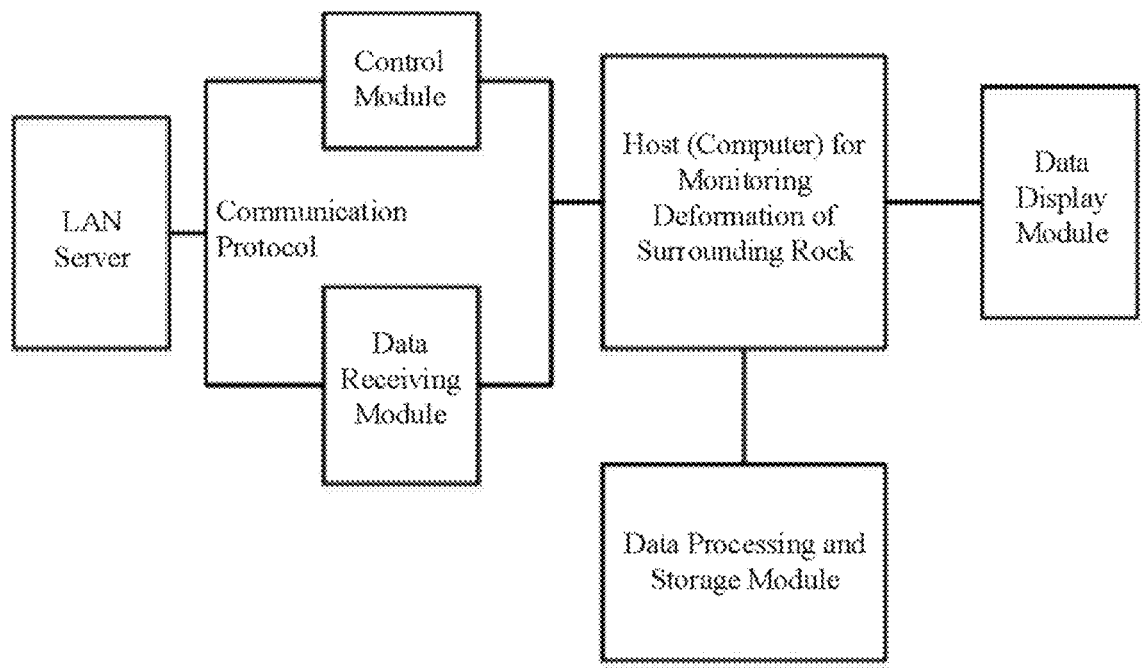
FIG. 7 is a schematic structure diagram illustrating a host system according to an embodiment of the present disclosure.

The host system shown in FIG. 7 mainly includes a computer, a data display module, a data processing and storage module, a data receiving module, a control module and a LAN server. The control module and the data receiving module exchange instructions and data with the data acquisition module by utilizing the LAN service according to the communication protocol, and the data processing and storage module decodes, filters and processes the received data, and stores the processed data in the computer. The data display module displays the processed data to provide the professionals with a basis of analysis and judgment.

Specifically, the data acquisition module transmits the data to the computer according to the communication protocol through the Wi-Fi communication module. At the same time, the host system sends a control instruction to the data acquisition module according to the communication protocol, to control the acquiring process of the data acquisition module. The received data is filtered by a mature filtering algorithm. The filtered data points are fitted into a longitudinal deformation profile (LDP) curve of the surrounding rock through the curve fitting algorithm. The professionals analyze and evaluate the curve to predict and prevent the possible TBM shield jamming accident.

Figure 8:
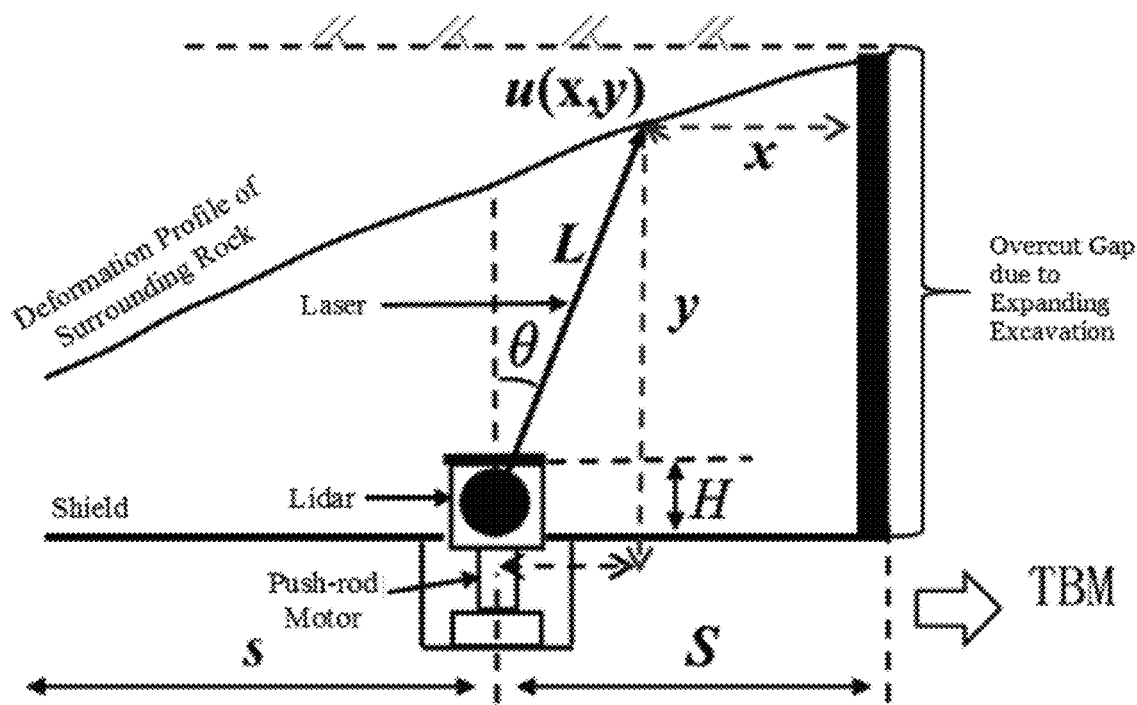
FIG. 8 is a schematic diagram illustrating a measurement principle of a lidar-based convergence deformation monitoring system for surrounding rock around a TBM shield region according to an embodiment of the present disclosure.

In one embodiment, as shown in FIG. 8, the lidar extends out of the shield. A distance from a measurement point u(x,y) to the lidar is L, an angle between the measure point and the lidar is θ, a height of the lidar extending out of the shield is H, and a distance between the origin of coordinates and the monitoring system is s, thus, the coordinates of the measurement point is calculated as follows:

$$u_x = s + L \cdot \sin\theta,$$

$$u_y = H + L \cdot \cos\theta.$$

The flow of the control software is as below. Firstly, a user is required to log in through the account and password. After logging in, a test is automatically performed to ensure a successful connection to the data acquisition module, and data acquisition module enters the working mode if there is no error. After entering the working mode, the operator can control the status of the data acquisition module according to the requirements. Taking the automatic acquisition mode as an example, the operator inputs the number of required acquisition (the lidar acquires two rounds of data each acquisition by default), sets a time to start measurement, and a time to stop measurement. When the preset measurement time is reached, the control software may raise the push-rod motor, activate the lidar and acquire data, and transmit the acquired data to computer for processing. When the time to stop measurement is reached, the lidar is deactivated and the push-rod motor is fallen. These control instructions are sent to the data acquisition module after being encoded through the communication protocol. The ARM chip of the data acquisition module controls other modules to implement corresponding operations according to the instructions. The control instructions issued by the control software are stored in the end of a control list of the data acquisition module. According to the principle of first in and first out, the data acquisition module may preferentially execute the instruction in the front of the control list. If encountering an instruction that requires urgent processing, it is needed to send a termination instruction to cancel all current tasks. Due to the limited storage space of the ARM main control chip of the data acquisition module, the data acquired by the lidar is sent to the computer in real time through a Wi-Fi module in one packet per 256-bit byte. After processing by the data processing and storage module of the computer, the processing result is automatically saved as a spreadsheet with a date as a title, to facilitate to draw the longitudinal deformation profile (LDP) curve of the surrounding rock. The research worker can also easily obtain the data of a certain day according to the date.

The communication protocol is given as follows. According to the requirements of the monitoring system, the disclosure sets a communication protocol suitable for the system. Each of the control instructions sent by the computer to the data acquisition module is headed with "A5", and then joined with a corresponding number to a corresponding control instruction, and the operation staff can expand it according to requirements. The transmission of the measurement data includes two steps, first sending a data request "5A06" to the computer, and then sending a packet with a header "5A" and joined 256-bit data information to the computer.

The specific embodiments of the disclosure are merely to illustrate the spirit of the disclosure. Those skilled in the art can make various modifications or supplement to the specific embodiments or replace the embodiments using a similar manner, without departing from the spirit of the invention or going beyond the scope as defined by the appended claims.

Although this disclosure very frequently uses terms such as the left side plate 1 of the protective case, the rear plate 2 of the protective case, the top plate of the protective case, the left and right mud shields 4, the guide rod 5, the front and rear mud shields 9, the tempered glass cover 7, the lidar 8, the right side plate 10 of the protective case, the mounting plate 12, the lidar limit plate 14, the linear bearing 16, the H-bridge circuit 19, the power supply module 18, the push-rod connection head 23, the push rod 27 of the push-rod motor, and the circuit adapter plate 21 and so on, however, the possibility of using other terms is not excluded. These terms are only used for describing and explaining the essence of the disclosure more conveniently, and it is contrary to the spirit of the disclosure to interpret them as any additional limitation.

What is claimed is:

1. A lidar-based convergence deformation monitoring system for surrounding rock around a tunnel boring machine (TBM) shield region, comprising:
a data acquisition module, comprising a lidar, a push-rod motor, an H-bridge circuit, a power supply module, an ARM chip, a guide rod, a linear bearing, a tempered glass cover and a protective case,
wherein: the lidar and the push-rod motor are connected by a lidar connector and a push-rod connection head, to acquire raw data of the surrounding rock and store the raw data in the ARM chip; the push-rod motor is fastened to a mounting plate of the protective case through a fastening plate of the push-rod motor; the ARM chip, the fastening plate of the push-rod motor and the H-bridge circuit are fastened to the mounting plate of the protective case by screws; the power supply module is fastened within the protective case; a middle portion of a top plate of the protective case directly opposite to the lidar is provided with a lidar hole having a same size as the lidar, to allow the lidar to extend out of the protective case; the tempered glass cover is mounted above the lidar hole, and the tempered glass cover is connected to the guide rod through a through hole in the tempered glass cover; the guide rod is combined with the linear bearing to allow the tempered glass cover to freely move in a vertical direction; the linear bearing is connected to the top plate by screws passing through through-holes on both sides of the linear bearing; and the protective case is fastened to an inner wall of a TBM shield through two mounting brackets on both sides of the protective case, and the inner wall is provided with a hole having a same size as the tempered glass cover, to facilitate the lidar to extend out of the protective case to perform a measurement;
wherein the lidar is fastened to the lidar connector by screws passing through four threaded holes in a base of the lidar, while the lidar is connected to a lidar positioning plate by utilizing a side threaded hole of the lidar, and the lidar positioning plate is mounted such that the lidar connector is prevented from rotating around one of the screws as an axis.

2. The system according to claim 1, wherein the push-rod motor comprises the push-rod connection head, a push rod and a second motor, the push-rod connection head is combined with the push rod through an external thread, and the second motor is configured to provide power for rising and falling of the push rod.

3. The system according to claim 1, wherein the push-rod connection head has an L-shaped slot, such that the lidar positioning plate and the L-shaped slot of the push-rod connection head position on the lidar connector together.

4. The system according to claim 3, wherein the lidar connector is fastened to the push-rod connection head through a screw and a lock nut matching the screw, and a washer is mounted between the push-rod connection head and the screw to increase sealing and slip resistance.

5. The system according to claim 1, wherein left and right mud shields and front and rear mud shields are symmetrically arranged around the lidar hole respectively, and are fastened by screws, which prevent the protective case from losing sealing which results in that rock residue and sediment flow into the protective case when the lidar extends out of the protective case.

6. The system according to claim 1, wherein lidar limit plates are symmetrically mounted on both sides of the lidar, the lidar limit plates are fastened to the top plate by screws to ensure that the lidar is kept to be aligned with the lidar hole.

7. The system according to claim 1, wherein the lidar is connected with the push-rod motor, and the raw data acquired by scanning the surrounding rock through the lidar comprises angle and distance information, to obtain a deformation amount of the surrounding rock through a corresponding algorithm to draw a longitudinal deformation profile (LDP) curve of the surrounding rock.

8. The system according to claim 1, wherein the tempered glass cover is transparent, a number of the through holes is four and a number of the guide rods is four.

9. The system according to claim 1, wherein the power supply module is fastened through a U-shaped guide rail.

10. The system according to claim 1, wherein the system further comprises a Wi-Fi communication module, the Wi-Fi communication module is mounted on a side plate of the protective case, and the data acquisition module interacts with a host system through the Wi-Fi communication module.

11. The system according to claim 10, wherein the host system comprises:
a computer, a data display module, a data processing and storage module, a data receiving module, a control module and a local area network (LAN) server.

12. The system according to claim 11, wherein the host system converts angle and distance information measured through the lidar into a coordinate of a measurement point on a longitudinal profile of the surrounding rock around the TBM shield region.

13. The system according to claim 12, wherein the host system filters the coordinate through a filtering algorithm and fits the filtered coordinate into an LDP curve of the surrounding rock through a curve fitting algorithm.

14. The system according to claim 11, wherein a data result processed by the computer is automatically saved as a spreadsheet with a date as a title, deformation information of the surrounding rock is obtained by a subsequent data processing to draw a corresponding longitudinal deformation profile (LDP) curve.

15. The system according to claim 11, wherein an account and a password are adopted to log in a control software, to perform multi-user operation and avoid mutual interference.

16. The system according to claim 10, wherein the host system sends a control instruction to the data acquisition module according to a communication protocol, to control a process of data acquisition.

17. The system according to claim 10, wherein the host system is mounted in a rear control cabin of the TBM.

18. The system according to claim 1, wherein a measurement of deformation of the surrounding rock is completed without affecting a normal operation of the TBM.

* * * * *